United States Patent
Johannsen

(10) Patent No.: US 9,216,783 B2
(45) Date of Patent: Dec. 22, 2015

(54) CAP AND PIN RETENTION SYSTEM

(71) Applicant: Caterpillar Inc., Peoria, IL (US)

(72) Inventor: Eric J. Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 73 days.

(21) Appl. No.: 14/276,893

(22) Filed: May 13, 2014

(65) Prior Publication Data

US 2015/0329157 A1 Nov. 19, 2015

(51) Int. Cl.
*B21L 9/06* (2006.01)
*B62D 55/21* (2006.01)

(52) U.S. Cl.
CPC .................................... *B62D 55/21* (2013.01)

(58) Field of Classification Search
CPC ...... B62D 55/21; B62D 55/213; B62D 55/211
USPC .................................................. 305/202, 204
See application file for complete search history.

(56) References Cited

U.S. PATENT DOCUMENTS

| | | | |
|---|---|---|---|
| 1,983,548 A | 12/1934 | Knox et al. | |
| 2,430,573 A * | 11/1947 | Krotz ................ | B62D 55/0887 305/42 |
| 2,780,830 A * | 2/1957 | Kammerer, Jr. .......... | E05D 5/12 16/381 |
| 3,027,201 A * | 3/1962 | Blazek ..................... | E05D 5/12 D55/213 |
| 3,309,864 A * | 3/1967 | Arndt ..................... | F16C 11/04 305/204 |
| 4,083,611 A | 4/1978 | Schaffner et al. | |
| 4,120,537 A | 10/1978 | Roley et al. | |
| 4,129,045 A | 12/1978 | Kishitani | |
| 4,163,589 A | 8/1979 | Fox et al. | |
| 4,277,199 A | 7/1981 | Livesay | |
| 4,288,172 A * | 9/1981 | Livesay ............. | B62D 55/0887 305/59 |
| 4,408,646 A * | 10/1983 | Forsyth .................... | B60C 27/20 152/179 |
| 4,572,588 A * | 2/1986 | Wiesner ................. | B62D 55/211 305/203 |
| 4,583,792 A * | 4/1986 | Erlenmaier ............ | B62D 55/32 305/204 |
| 4,813,466 A * | 3/1989 | Forsyth .................... | B60C 27/20 152/179 |
| 4,838,623 A * | 6/1989 | Mineart ................ | B62D 55/211 305/204 |
| 4,995,678 A * | 2/1991 | Jinkens ................. | B62D 55/205 305/204 |
| 5,201,171 A * | 4/1993 | Anderton ............. | B62D 55/205 29/517 |

(Continued)

FOREIGN PATENT DOCUMENTS

| | | |
|---|---|---|
| GB | 569508 | 5/1945 |
| JP | 06041265 | 6/1994 |

(Continued)

OTHER PUBLICATIONS

Caldwell, *Mountain Bike Camping and Bikepacking Guide*, Old Glory MTB, downloaded from http://oldglorymtb.com/mountain-bike-camping-and-bikepacking-guide/ on May 13, 2014, 23 pp.

*Primary Examiner* — Jeffrey J Restifo

(57) ABSTRACT

A machine tread including a first and second pair of plates. The plates have corresponding first ends and second ends, and the second ends of the first pair include outer bores. The first ends of the second pair include aligned bushing bores. The first ends of the second pair fit between the second ends of the first pair, aligning the outer and bushing bores. Ends of a bushing including an inner bore engage the bushing bores forming a pin bore through the inner and outer bores. A retention pin fits in the segmented pin bore. A head end abuts an external surface of the first pair of plates and a locking end extends past the pin bore. A retention cap engages the locking end. A dowel pin fits through a dowel pin bore in the retention cap and the locking end to limit movement of the retention pin.

20 Claims, 9 Drawing Sheets

(56) References Cited

U.S. PATENT DOCUMENTS

| | | |
|---|---|---|
| 5,685,548 A | 11/1997 | Casemir et al. |
| 6,270,173 B1 * | 8/2001 | Hashimoto ............ B21K 25/00 305/200 |
| 6,564,539 B2 | 5/2003 | Bedford et al. |
| 7,354,200 B2 * | 4/2008 | Yamamoto ............. B62D 55/15 305/202 |
| 8,336,970 B2 | 12/2012 | Johannsen et al. |
| 2004/0251741 A1 | 12/2004 | Spies et al. |
| 2008/0265667 A1 | 10/2008 | Livesay |
| 2013/0169034 A1 | 7/2013 | Hisamatsu |

FOREIGN PATENT DOCUMENTS

| | | |
|---|---|---|
| JP | 07-117737 A | 5/1995 |
| JP | 08295268 | 11/1996 |
| JP | 2001219877 | 8/2001 |
| KR | 2008-0038632 A | 5/2008 |
| WO | WO 2013/175667 A1 | 11/2013 |

\* cited by examiner

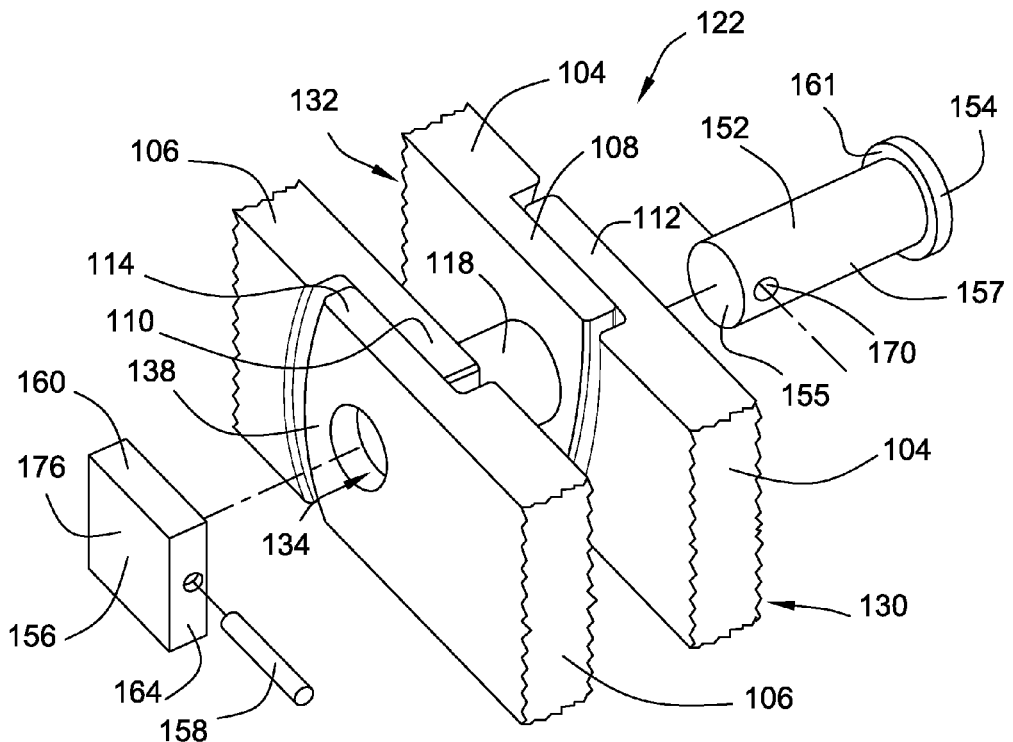
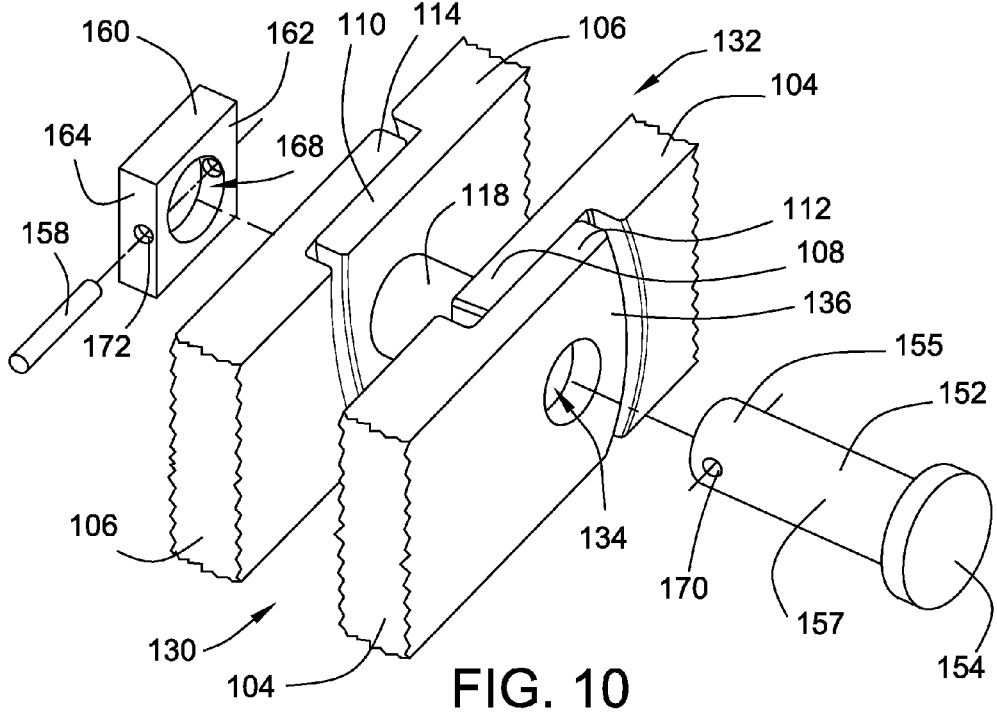

CAP AND PIN RETENTION SYSTEM

TECHNICAL FIELD

This patent disclosure relates generally to retention systems and, more particularly, to systems for retaining pins on wheels, treads, tracks, or other equipment used with mining and construction machinery.

BACKGROUND

Various types of mining and construction machines, such as tractors, bulldozers, backhoes, excavators, motor graders, and mining trucks commonly use track-type treads as a method of machine propulsion. The track treads are generally constructed of modular plates made from steel, rubber, or other suitable materials, forming adjacent links joined to form a continuous band or tread. The continuous band of linkages is then driven by two or more wheels to move the machine.

Adjacent tread links are commonly joined to one another with a pivoting connection that allows each link to pivot with respect to adjacent links. Cylindrical pins are often used to create this pivotal connection between adjacent links. Because machines having track-type treads are often used under rugged conditions, such as on construction sites, mines, and excavations, the links and the retaining system used to secure the pins to the links are subject to wear from abrasions, repeated impact, and other sources. Due to these rough operating conditions, it may become necessary to remove one or more pins connecting adjacent links to allow for repairs while in the field or elsewhere. A pin retention system that can be easily and quickly installed and removed in the field decreases machine downtime and results in higher work efficiency.

An improved, durable pin retention system is needed that increases useful life of the retention system's parts while allowing for easy removal and installation in the field.

The inventors have created this background description to aid the reader and not to indicate that any of the indicated problems were themselves appreciated in the art. While the principles described in the disclosure can, in some respects and embodiments, alleviate the problems inherent in other systems, the scope of the invention is defined by the attached claims, and not by the ability of any disclosed feature to solve any specific problem noted herein.

SUMMARY

In an embodiment, the present disclosure describes a machine with a continuous tread. The machine includes a first pair of plates in spaced relation to one another. The plates have corresponding first ends and second ends, and the second ends include coaxially aligned outer pin bores. The machine includes a second pair of plates in spaced relation to one another. The plates have corresponding first and second ends. The first ends include coaxially aligned bushing bores. The second pair of plates is disposed adjacent the first pair of plates such that the first ends of the second pair of plates are disposed between the second ends of the first pair of plates so as to coaxially align the outer pin bores with the bushing bores. The machine includes a tubular bushing including an inner pin bore between opposite ends of the tubular bushing. The ends of the bushing are disposed in the bushing bores of the first ends of the second pair of plates so as to form a segmented pin bore through the inner pin bore and the outer pin bores. The machine includes a retention pin disposed in the segmented pin bore so as to pivotally connect the first and second pair of plates. The retention pin has a head end and a locking end connected by a pin body. The head end is disposed in abutting relation with a first external surface of the first pair of plates, the pin body is disposed in the segmented pin bore, and the locking end extends past a second external surface of the first pair of plates opposite the head end. The machine includes a retention cap having a cap body with a cap bearing surface and an outer surface. The cap body is configured to engage the locking end of the retention pin such that the cap bearing surface abuts the second external surface of the first pair of plates. The cap body and the retention pin include a dowel pin bore extending from the outer surface at least partially through the cap body and the retention pin. A dowel pin is disposed within the dowel pin bore at least partially through the retention cap and the retention pin. The dowel pin is configured to limit axial movement of the retention pin relative to the segmented pin bore and the retention cap.

In another embodiment, the present disclosure describes a retention system for joining adjacent links in a continuous tread. The continuous tread includes a plurality of links pivotally connected to one another. Each of the plurality of links has a pair of plates with first ends and second ends, where the first ends are connected by a tubular bushing and the second ends form a cutout into which the first ends and the tubular bushing of an adjacent link are disposed. The retention system includes a retention pin having a head end and a locking end connected by a pin body. The head end is disposed in abutting relation with a first external surface of a first link, the pin body is disposed in a segmented pin bore formed through the second ends of the first link and the tubular bushing of a second link, and the locking end extends past a second external surface of the first link opposite the head end. Outer pin bores of the segmented pin bore are in aligned relation through the second ends of the first link. An inner pin bore of the segmented pin bore extends through the tubular bushing of the second link in aligned relation with the outer pin bores of the segmented pin bore. A retention cap has a cap body with a cap bearing surface and an outer surface. The cap body is configured to engage the locking end of the retention pin such that the cap bearing surface abuts the second external surface of the first link. The cap body and the retention pin include a dowel pin bore extending from the outer surface at least partially through the cap body and the retention pin. A dowel pin is disposed within the dowel pin bore at least partially through the retention cap and the retention pin. The dowel pin is configured to limit axial movement of the retention pin relative to the segmented pin bore and the retention cap.

In another embodiment, the present disclosure describes a continuous tread for a machine. The continuous tread includes a first pair of plates in spaced relation to one another, the plates having corresponding first ends and second ends. The second ends include coaxially aligned outer pin bores. The continuous tread includes a second pair of plates in spaced relation to one another. The plates have corresponding first and second ends, and the first ends include coaxially aligned bushing bores. The second pair of plates is disposed adjacent the first pair of plates such that the first ends of the second pair of plates are disposed between the second ends of the first pair of plates so as to coaxially align the outer pin bores with the bushing bores. The continuous tread includes a tubular bushing with an inner pin bore between opposite ends of the tubular bushing. The ends of the bushing are disposed in the bushing bores of the first ends of the second pair of plates so as to form a segmented pin bore through the inner pin bore and the outer pin bores. The continuous tread includes a retention pin disposed in the segmented pin bore so as to pivotally connect the first and second pair of plates. The retention pin has a head end and a locking end connected by a pin body. The head end has a flange extending radially away from the retention pin and has a flange bearing surface disposed in abutting relation with a first external surface of the first pair of plates. The pin body is disposed in the segmented pin bore and the locking end extends past a second external surface of the first pair of plates opposite the head end. The continuous tread includes a retention cap that has a cap body with a cap bearing surface and an outer surface. The cap body includes a retention pin bore extending from the cap bearing surface partially through the cap body. The retention bore is configured to receive the locking end of the retention pin such that the cap bearing surface abuts the second external surface of the first pair of plates. The cap body and the retention pin include a dowel pin bore extending between opposite first and second sides of the outer surface of the cap body and through the retention pin. The continuous tread also includes a dowel pin disposed within the dowel pin bore through the retention cap and the retention pin by an interference fit. The dowel pin is configured to limit axial movement of the retention pin relative to the segmented pin bore and the retention cap.

BRIEF DESCRIPTION OF THE DRAWINGS

FIG. 9 is an exploded view of a continuous tread with links utilizing the retention system of FIG. 6.

FIG. 10 is another exploded view of a continuous tread with links utilizing the retention system of FIG. 6.

DETAILED DESCRIPTION

Figure 1:
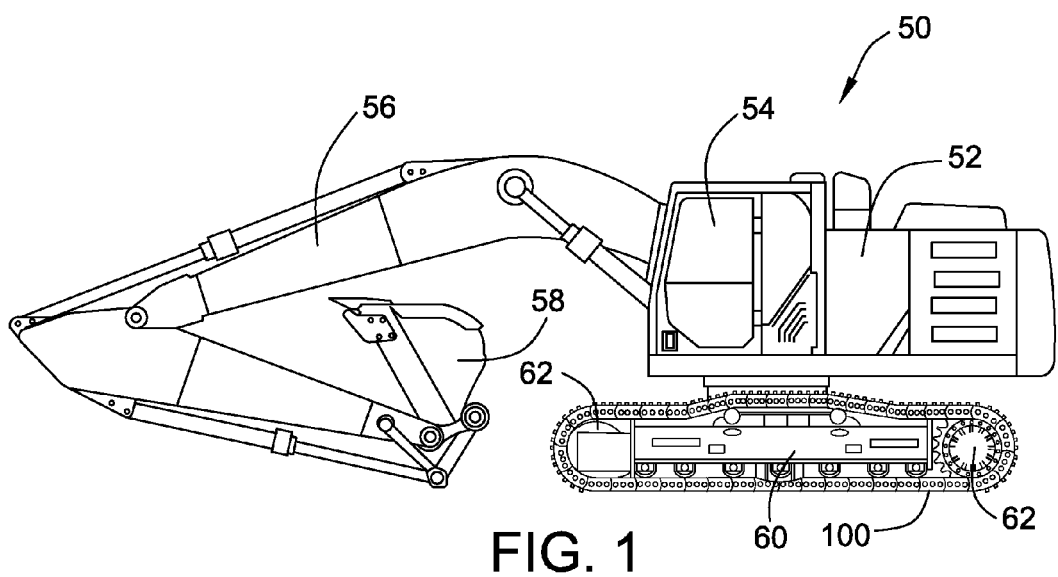
FIG. 1 is a side view of a machine featuring a track-type continuous tread with links utilizing a retention system in accordance with the disclosure.

This disclosure relates to retention systems for continuous tread linkages, specifically pin retention systems, utilized in various types of tractors, bulldozers, backhoes, excavators, motor graders, mining trucks, and other construction machinery. FIG. 1 shows an embodiment of a machine 50 in the form of a hydraulic excavator that can include an embodiment of a continuous tread 100 utilizing a retention system 150 constructed in accordance with principles of the present disclosure. Among other uses, hydraulic excavator can be used to dig trenches, handle materials, demolition, and in various surface mining or other construction applications. As shown, the machine 50 includes a body 52 with a cab 54 to house a machine operator. The machine includes a boom system 56 connected to the body 52 on one end and an implement 58 on the opposite end. The machine also has a chassis 60 connected to the body 52. The chassis 60 has at least two wheels 62 that drive a continuous tread 100, propelling the machine 50 in response to controls manipulated by the machine operator.

Figure 2:
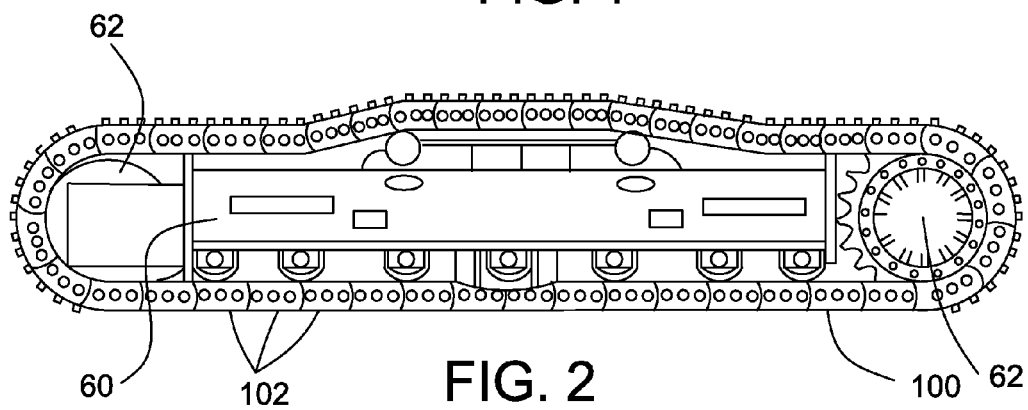
FIG. 2 is a side view of a machine chassis having a continuous tread with links utilizing a retention system in accordance with the disclosure.
Figure 3A:
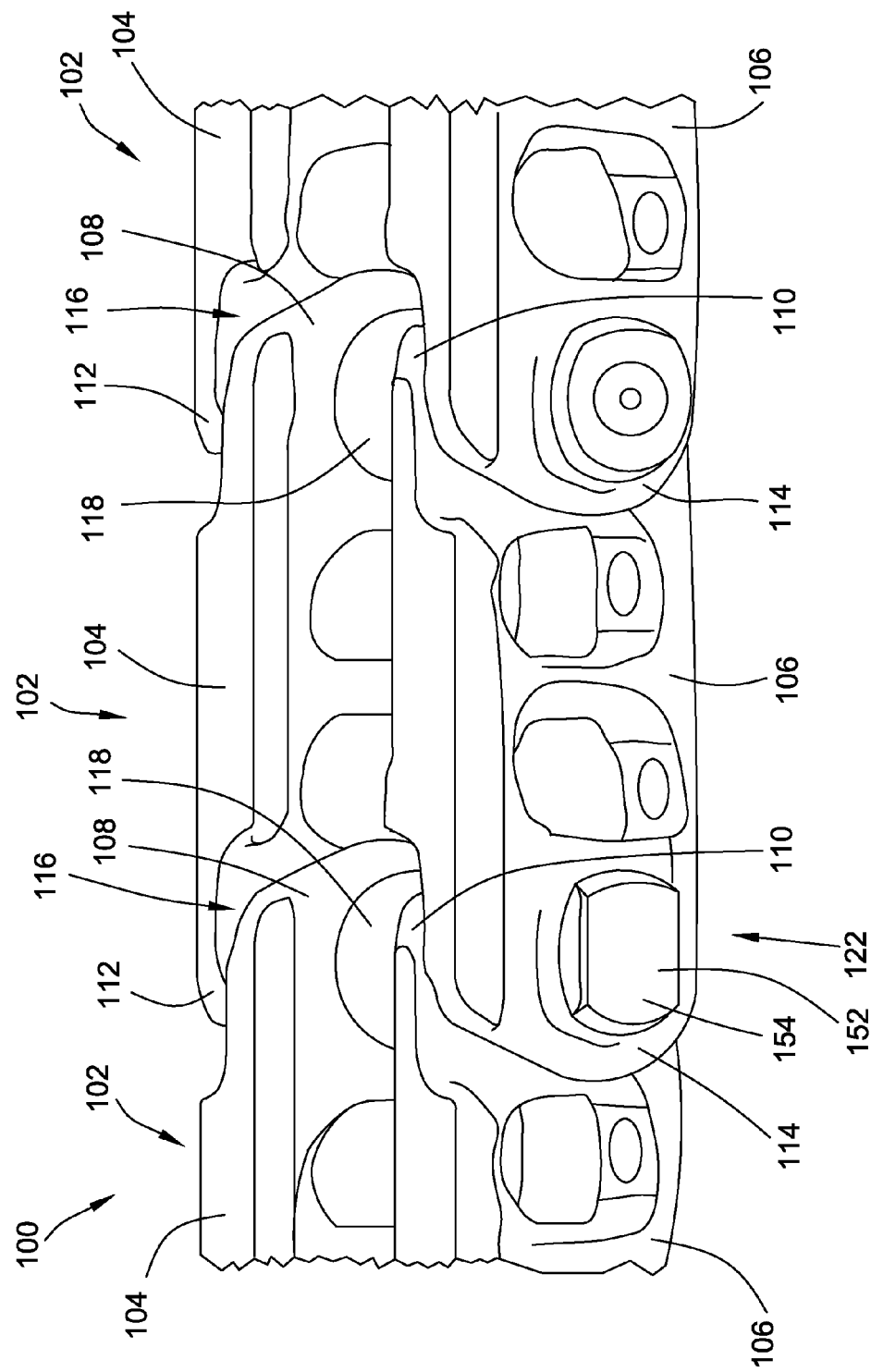
FIG. 3A is a partial perspective view of a continuous tread with links utilizing a retention system in accordance with the disclosure.
Figure 3B:
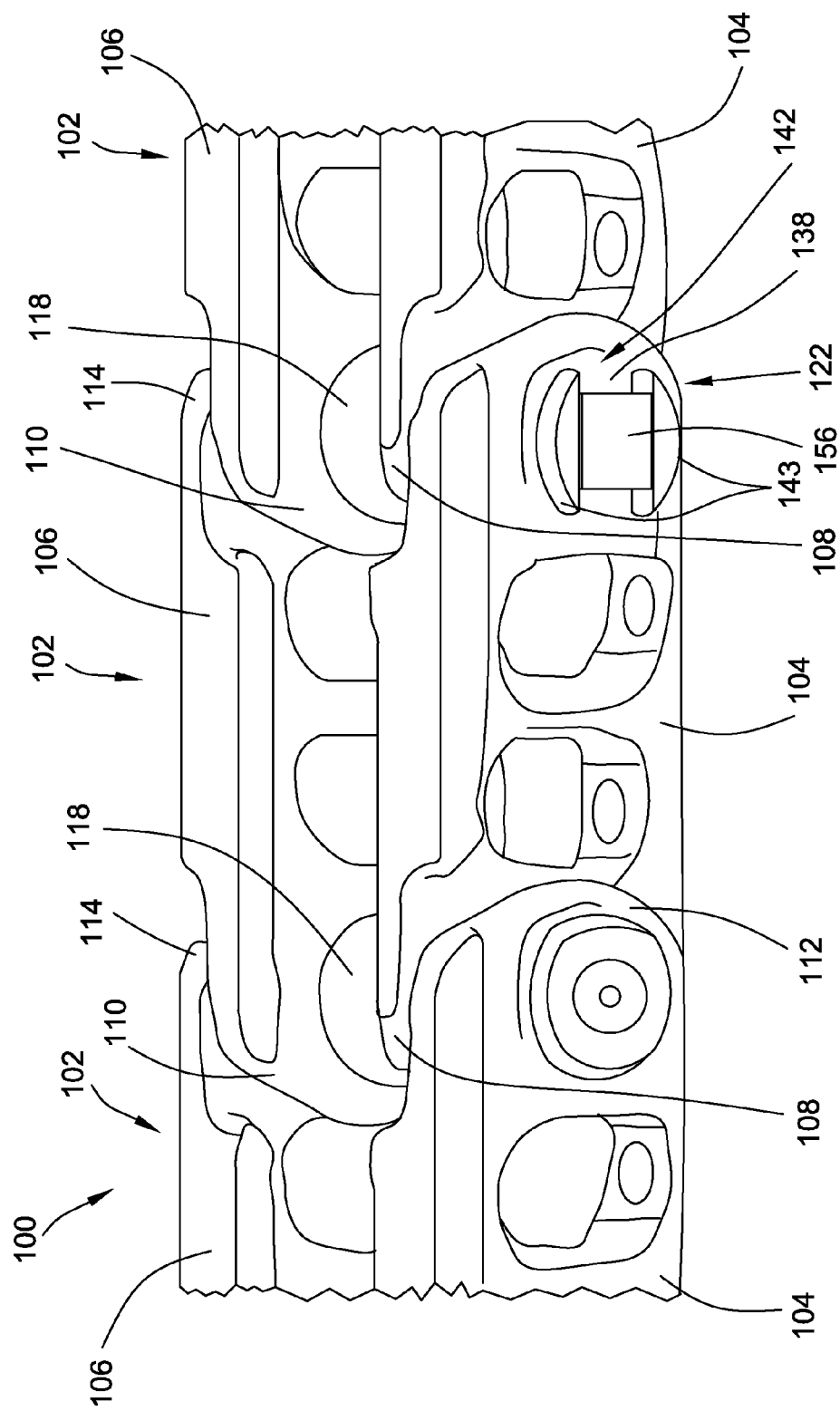
FIG. 3B is another partial perspective view of the continuous tread of FIG. 3A.

FIG. 2 shows an enlarged side view of the chassis 60 equipped with the continuous tread 100. The continuous tread 100 can be made up of a plurality of adjacent links 102 pivotally connected to one another to create a continuous loop. As shown in FIGS. 3A and 3B, each link 102 can include a pair of plates 104, 106 in spaced relation to one another and a bushing 118 connecting the pair of plates. Each plate 104, 106 can have corresponding first ends 108, 110 and second ends 112, 114, where the first ends and second ends are opposite one another on each link. The first ends 108, 110 are substantially aligned with one another, and the second ends 112, 114 are substantially aligned with one another. In the embodiment illustrated in FIGS. 3A and 3B, the bushing 118 spans the space between each pair of plates 104, 106, connecting the corresponding first ends 108, 110 of each link 102. In some embodiments, the bushing 118 can be either a separate part from the link 102 or integral with the link.

In certain embodiments, such as the embodiment illustrated in FIGS. 3A, 3B, 4, 9, and 10, the first ends 108, 110 can be offset from the second ends 112, 114 such that the first ends are nearer to one another than the second ends. The offset plate geometry in such embodiments can form cutouts 116 between corresponding second ends 112, 114 into which the first ends 108, 110 of an adjacent link 102 can fit. As assembled, pairs of plates 104, 106 from adjacent links 102 in the continuous tread 100 can be disposed adjacent one another such that the first ends 108, 110 of a link substantially align with the second ends 112, 114 of an adjacent link, forming a linkage joint 122 between the two adjacent links. A retention pin 152 for a retention system 150 can pass through the linkage joint 122 and pivotally connect the adjacent links to one another. In such embodiments, the retention pin 152 can pass through the first ends 108, 110 and the bushing 118 of a link and the second ends 112, 114 of an adjacent link.

FIG. 3A illustrates a head end 154 of a retention pin 152 disposed on one side of a linkage joint 122 that forms a at least one connection between adjacent links 102 in the continuous tread 100. FIG. 3B illustrates the opposite side of the linkage joint 122 showing part of a retention cap 156 of the retention system 150. The retention system 150 is adapted to removably secure the retention pin 152 within the linkage joint 122 and, thus, removably secure adjacent links 102 to one another in a pivoting manner. While the embodiment illustrated in FIG. 3B shows portions of one retentions systems 150 used to secure a linkage joint 122, other embodiments of the continuous tread 100 can use any number of retention systems 150 on any number of linkage joints 122 between adjacent links 102. For embodiments in which a single retention system 150 is used on a single linkage joint 122, such as in FIGS. 3A and 3B, the remainder of the linkage joints 122 in the continuous tread 100 can be connected using other connecting systems, either presently known or later developed. In such embodiments, removal of the single retention pin 152 can break continuity of the continuous tread 100, allowing removal of the tread from the chassis 60 for repair or other purposes.

Figure 4:
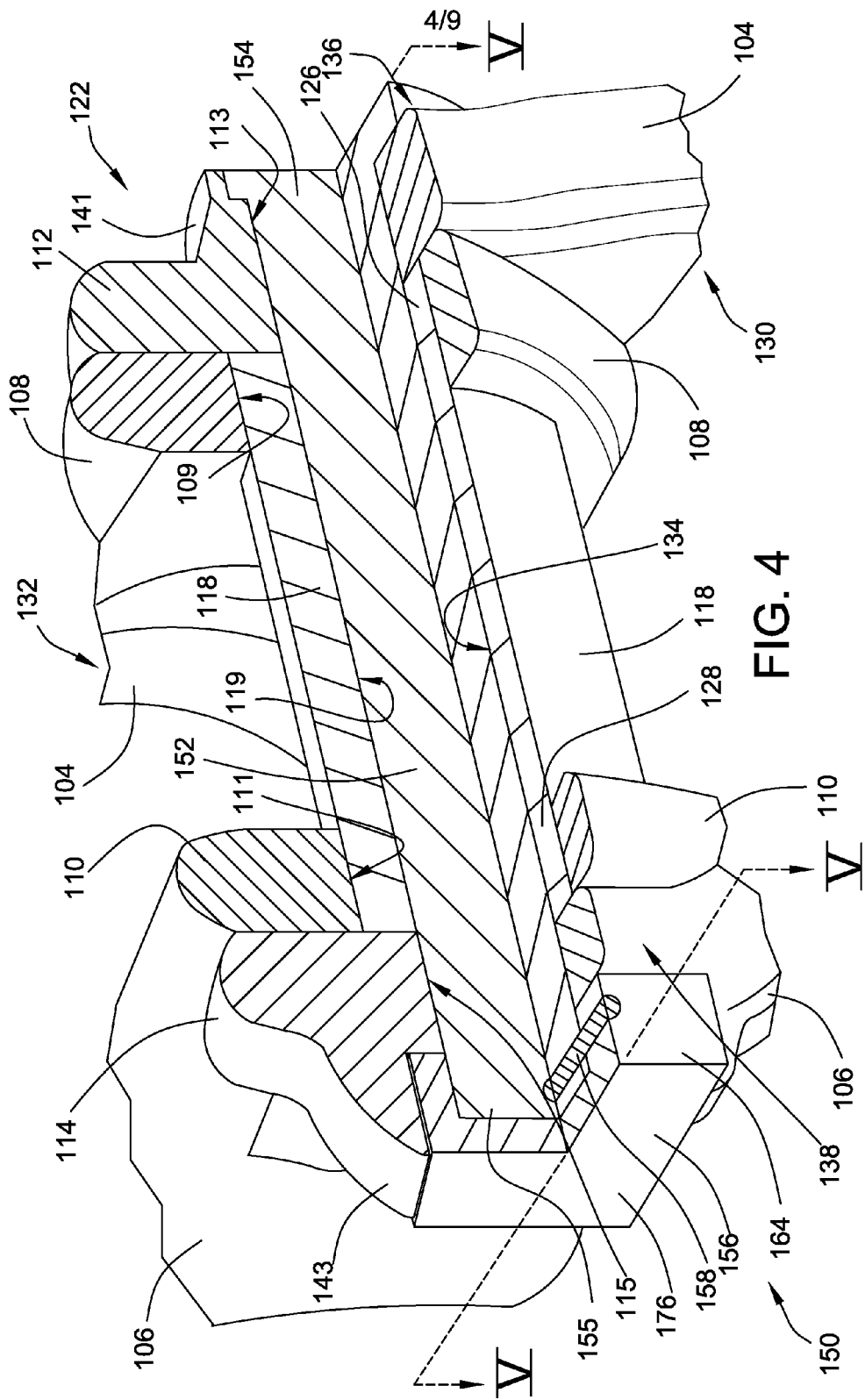
FIG. 4 is a partial sectional perspective view of a continuous tread with links utilizing a retention system in accordance with the disclosure.
Figure 5:
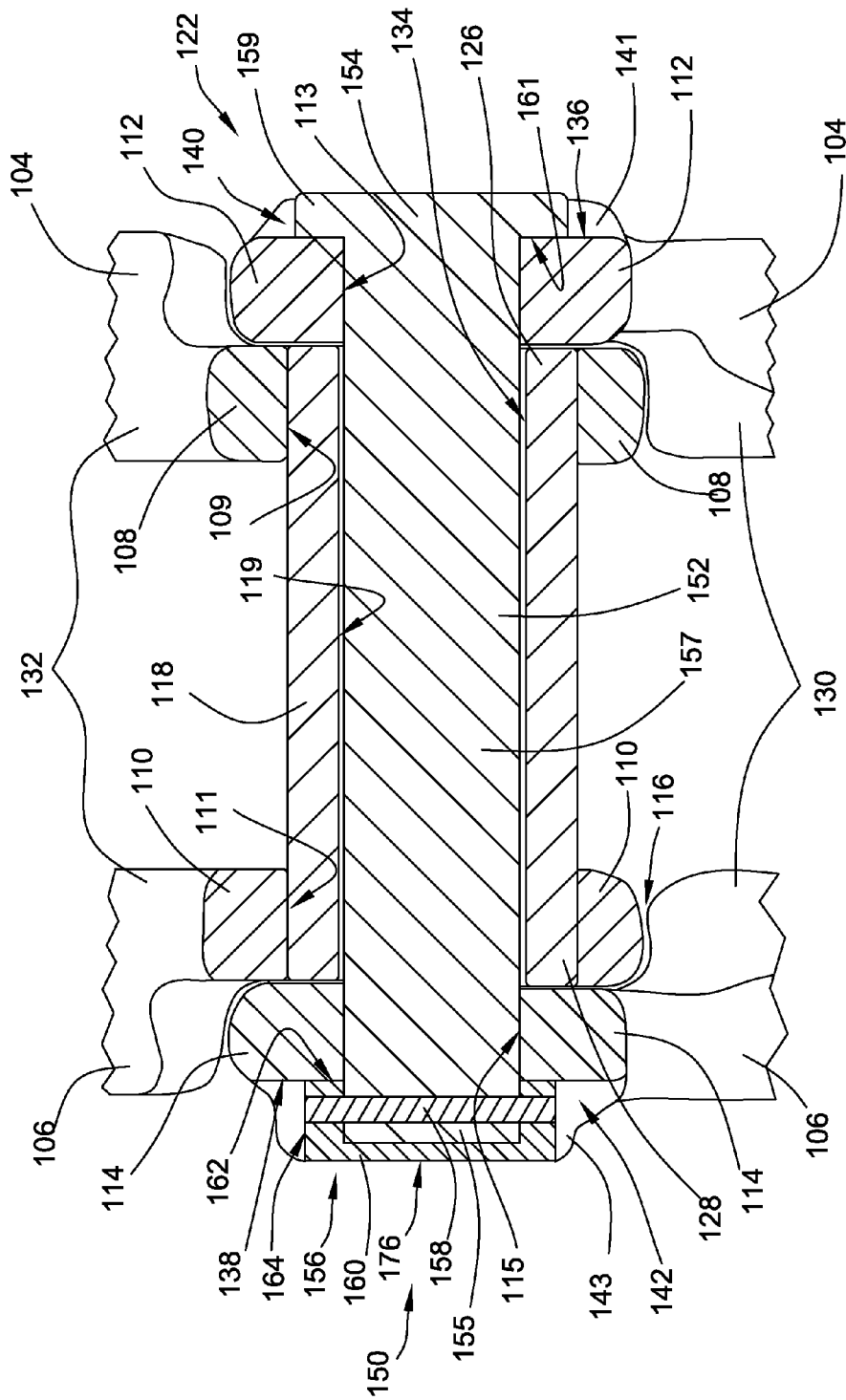
FIG. 5 is a cross sectional top view of a continuous tread with links utilizing the retention system of FIG. 4.

FIGS. 4 and 5 show sectional views of the linkage joint 122 between two adjacent links, a first link 130 and a second link 132, each of the first and second link having similar construction to and like reference numerals as the plurality of links 102 described above in reference to FIGS. 3A and 3B, and as will be further described.

In the illustrated embodiment, the first link 130 and the second link 132 each have a pair of plates 104, 106. FIGS. 4-5 illustrate the first ends 108, 110 of the second link 132 and the second ends 112, 114 of the first link 130. The first ends 108, 110 of the second link 132 can be connected by the tubular bushing 118. The second ends 112, 114 of the first link 130 form the cutout 116 into which the first ends 108, 110 and the tubular bushing 118 of the second link 132 are disposed.

The second ends 112, 114 can each include an outer pin bore 113, 115 through the respective plates 104, 106. Each of the outer pin bores 113, 115 can be coaxially aligned with one another across the cutout 116. The first ends 108, 110 of the second link 132 can include a pair of coaxially aligned bushing bores 109, 111 through the respective plates 104, 106. Opposite ends 126, 128 of the bushing 118 are adapted to fit within the respective bushing bores 109, 111. The bushing 118 can include an inner pin bore 119 between the ends 126, 128 of the bushing 118. The bushing 118 can have a smooth cylindrical surface surrounding the inner pin bore. The first ends 108, 110 of the second link 132 can fit into the cutout 116 between the second ends 112, 114 of the first link 130 such that the outer pin bores 113, 115 can be coaxially aligned with the bushing bores 109, 111 and the inner pin bore 119 of the bushing 118. The ends 126, 128 of the bushing 118 can be press fit into the respective bushing bores 109, 111 to form an interference fit with the respective plates 104, 106. In other embodiments, however, the bushing 118 can be connected to the plates 104, 106 of the second link 132 by adhesive, welding, or any other suitable connection method. In some embodiments, the bushing bore 118 is integrally formed with the second link 130. In such embodiments, the pair of plates 104, 106 of the second link 132 and the bushing 118 are a single part, with the inner pin bore formed through the bushing and both first ends 108, 110 of each link.

As illustrated in FIGS. 4 and 5, the outer pin bores 113, 115 of the second ends 112, 114 of the first link 130 and the inner pin bore 119 of the second link can be aligned adjacent one another to form a segmented pin bore 134 through the entire linkage joint 122. Each end of the segmented pin bore 134 terminates at external surfaces 136, 138 of the second ends 112, 114 of the first link 130. In some embodiments, the first link 130 the external surfaces 136, 138 can be a first external surface 136 and a second external surface 138. The first external surface 136 can include a first external cutout 140 between first surface protrusions 141. The second external surface 138 can include a second external cutout 142 between second surface protrusions 143. The respective external cutouts 140, 142 can provide protective pockets for housing, respectively, the head end 154 of the retention pin 152 and the retention cap 156, which will be described in further detail below.

Figure 6:
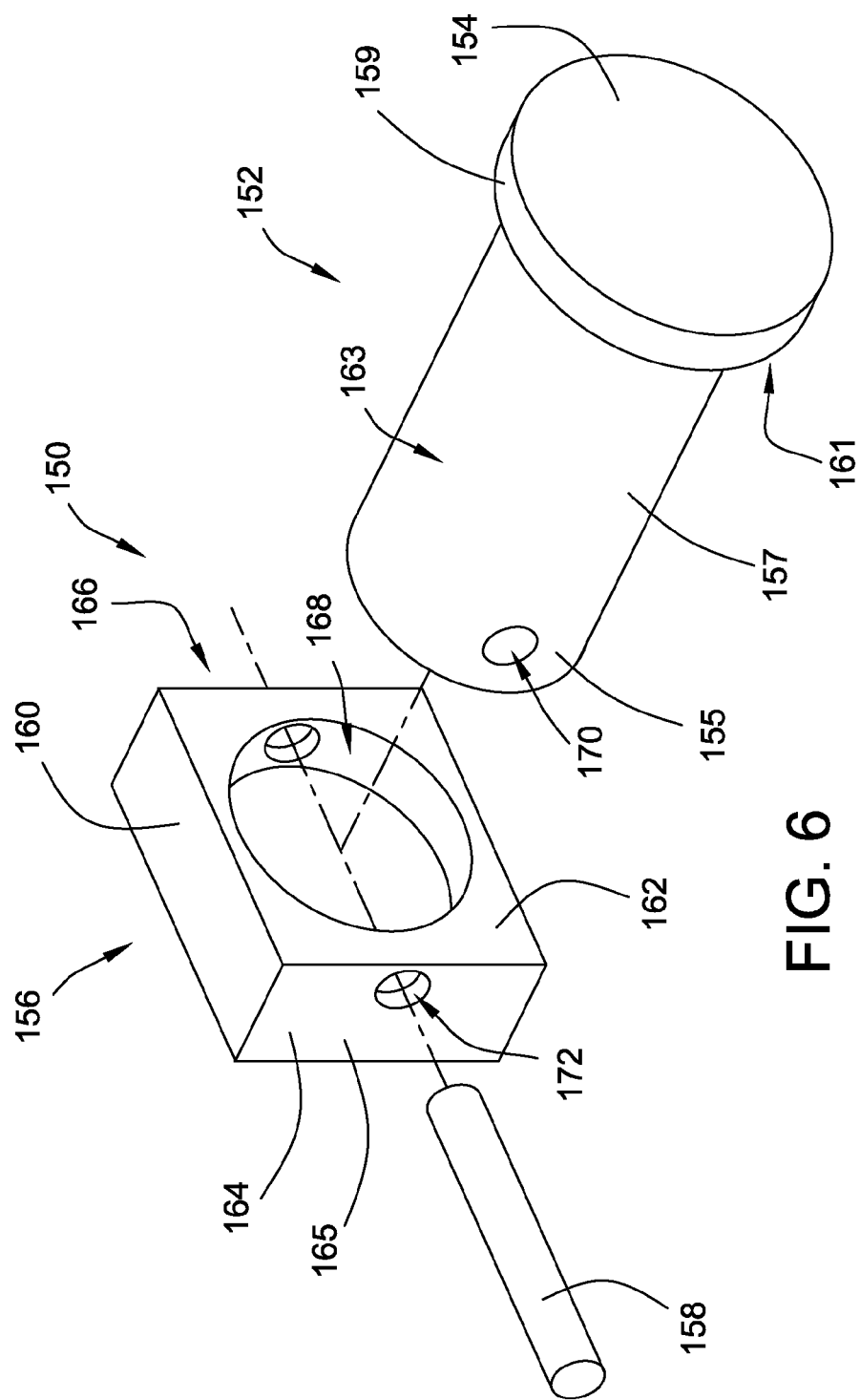
FIG. 6 is an exploded perspective view of an embodiment of the retention system in accordance with the disclosure.

As illustrated in exploded view in FIG. 6, the retention system 150 includes a retention pin 152, a retention cap 156, and a retention dowel pin 158. The retention pin 152 can be disposed through the segmented pin bore 134 of the linkage joint 122 to removably and pivotally secure the first link 130 to the second link 132. The retention pin 152 can have a head end 154 and a locking end 155 opposite one another and connected by a pin body 157. The head end 154 can include a flange 159 that extends radially away from the retention pin 152. The flange 159 can have a flange bearing surface 161 adjacent and substantially perpendicular to a cylindrical surface 163 of the retention pin 152, facing substantially toward the locking end 155 of the retention pin 152. In some embodiments, the cylindrical surface 163 of the retention pin 152 can be a smooth surface. The locking end 155 of the retention pin 152 can include an inner dowel pin bore 170 at least partially through the retention pin 152. In embodiments in which the inner dowel pin bore 170 is formed fully through the retention pin 152, the inner dowel pin bore 170 can terminate at the cylindrical surface 163 either side of the retention pin 152.

Figure 8A:
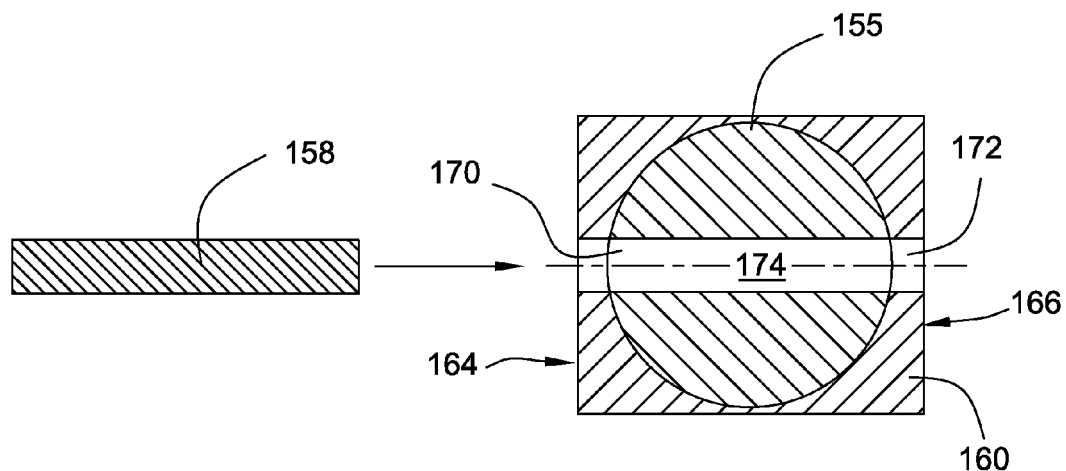
FIG. 8A is an exploded cross sectional view of the retention system of FIG. 6.

The retention cap 156 can have a cap body 160 with a cap bearing surface 162 and an outer surface 165 with a first side 164 and a second side 166. The cap body 160 can include a retention pin bore 168 that extends from the cap bearing surface 162 at least partially through the cap body. In some embodiments, the retention pin bore 168 can extend fully through the cap body 160. The retention pin bore 168 can be configured to receive the locking end 155 of the retention pin 152 such that the cap body 160 can engage the retention pin. The cap body 160 also includes an outer dowel pin bore 172 at least partially through the retention cap 156. The outer dowel pin bore 172 can be formed between the outside surface 165 of the cap body 160 and the retention bore 168, intersecting the retention pin bore 168 substantially perpendicularly. As best seen in FIG. 8A, when the retention system 150 is assembled with the locking end 155 of the retention pin disposed within the retention pin bore 168, the outer dowel pin bore 172 can coaxially align with the inner dowel pin bore 170 to form a dowel pin bore 174.

Figure 7:
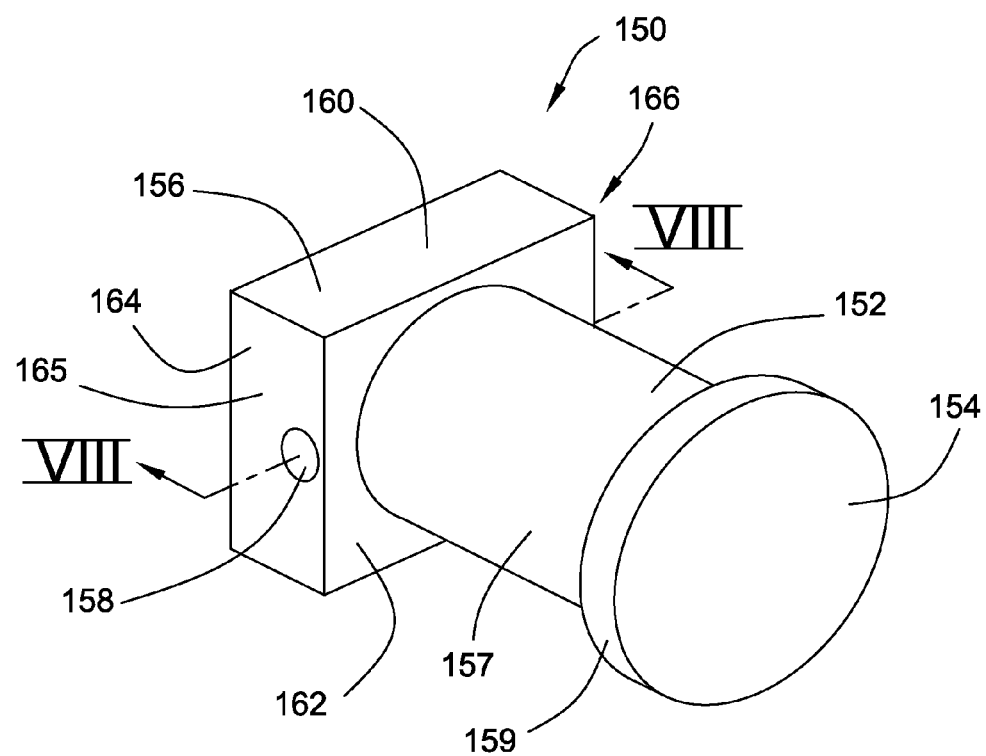
FIG. 7 is a perspective view of the retention system of FIG. 6.
Figure 8B:
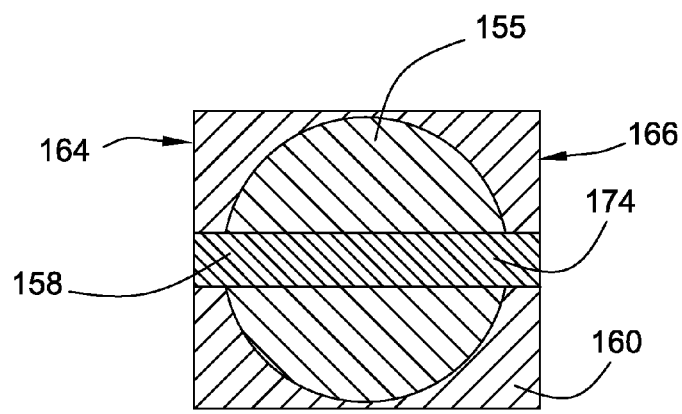
FIG. 8B is a cross sectional view of the retention system of FIG. 6.

FIG. 7 shows an embodiment of the retention system 150 as assembled for purposes of illustration. The dowel pin 158 can be disposed within the dowel pin bore 174 at least partially through the retention cap 156 and the retention pin 152. The dowel pin 158 can secure the retention cap 156 to the retention pin 152, limiting axial movement of the retention pin relative to the retention cap and the segmented pin bore 134 when the retention pin is disposed within the linkage joint 122. FIGS. 8A and 8B show sectional views of the retention system 150 that are cut looking toward the locking end 155 of the retention pin 152, where the section cuts through the cap body 160 at the centerline of the dowel pin bore 174 as indicated in FIG. 7. FIGS. 8A and 8B show the locking end 155 of the retention pin 152 engaging with the cap body 160 within the retention pin bore 168. FIG. 8A shows the dowel pin 158 outside of the dowel pin bore, and FIG. 8B shows the dowel pin secured within the dowel pin bore.

In some embodiments, the dowel pin 158 is press fit into the dowel pin bore 174, forming an interference fit between the dowel pin and the cap body 160, the dowel pin and the retention pin 152, or between the dowel pin and both the cap body and the retention pin. In some embodiments, dowel pin 158 is configured to be secured into or removed from the dowel pin bore 174 bore by hammering or other suitable force applied to either end of the dowel pin.

FIGS. 9 and 10 show exploded perspective views of the linkage joint 122 to further illustrate the relationship between the retention system 150 and the first and second links 130, 132.

Referring again to FIGS. 4 and 5, the retention system 150 can be applied to the linkage joint 122 to secure the first and second links 130, 132 to one another. When the retention pin 152 is disposed through the linkage joint 122, the flange bearing surface 161 of the head end 154 of the retention pin can be disposed in abutting relation with the first external surface 136 of the plate 104 of the first link 130. The pin body 157 can be disposed through the segmented pin bore 134, passing through the second ends 112, 114 of the first link 130, the first ends 108, 110 of the second link 132, and the tubular bushing 118. The locking end 155 of the retention pin 152 can extend past the second external surface 138 of the plate 106 of the first link 130. The retention cap 156 can engage the locking end 155 such that the outer dowel pin bore 172 coaxially aligns with the inner dowel pin bore 170 of the retention pin 152 and the cap bearing surface 162 abuts the second external surface 138 of the plate 106 of the first link 130. The dowel pin 158 can then be press fit or otherwise disposed within the dowel pin bore 174, passing at least partially through the cap body 160 and the retention pin 152. The dowel pin 158 can be configured to secure the retention cap 156 to the locking end 155 of the retention pin 152, limiting axial movement of the retention pin 152 relative to the segmented pin bore 134, the first and second links 130, 132, and the retention cap.

In some embodiments, such as the embodiment illustrated in FIGS. 4 and 5, the head end 154 of the retention pin 152 can be disposed in the first external cutout 140 between two first surface protrusions 141 protruding from the first external surface 136 of the plate 104 of the first link 130. Similarly, the retention cap 156 can be disposed in the second external cutout 142 between two second surface protrusions 143 protruding from the second external surface 138 of the plate 106 of the first link 130. Recessing the retention cap 156 and/or the head end 154 of the retention system 150 in the external cutouts 140, 142 can help protect the components of the retention system from bumps, abrasions, or other potentially damaging contact with the environment during use, which can prolong the useful life of the retention system. In some embodiments, the cap body 160 can have a top surface 176 opposite the cap bearing surface 162. In such embodiments, the top surface 176 of the cap body 160 can be recessed within the second external cutout 142 or can be coplanar with the two second surface protrusions 143.

Although various features of the disclosure are illustrated having specific shapes, other shapes suitable to accommodate the components and functionality described herein are also contemplated. For example, the retention cap 156 shown in the drawings is shaped like a rectangular prism, but it is contemplated that the retention cap can be a cylindrical prism, square-shaped, or have any irregular shape suited to a particular application or machine to best perform the described functionality. Alternative configurations for other components are similarly contemplated.

INDUSTRIAL APPLICABILITY

The industrial application of the cap and pin retention system as described herein should be readily appreciated from the foregoing discussion. The present disclosure can be applicable to any machine utilizing a track-type continuous tread for machine movement. In machines used for such applications, the linkages and retaining mechanisms of the continuous tread are exposed to rugged environmental conditions and vulnerable to damage.

The present disclosure, therefore, can be applicable to many different machines and environments. One exemplary use of the retention system of this disclosure can be in rugged excavation applications in which the excavating machine runs for protracted time periods with little downtime where tread linkages will require periodic maintenance in the field. In such applications, reducing machine downtime for maintenance can translate into higher machine work efficiency and lower costs. The retention cap described as part of the disclosed retention system protects the locking end of the retention pin and dowel pin from excess damage during machine operation. The retention system additionally provides machine operators or maintenance personnel the ability to quickly and easily remove the retention system from the continuous tread for any needed repairs or replacements. The maintenance personnel can simply force the dowel pin out of the dowel pin bore using a hammer or similar tool in order to remove the retention pin from the linkage joint. The disclosed retention system allows the maintenance personnel the ability to perform repairs in the field without heavy machinery or equipment normally only available off-site. As a result, machine downtime can be reduced and work efficiency increased.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A machine with a continuous tread comprising:
   a first pair of plates in spaced relation to one another, the plates having corresponding first ends and second ends, the second ends including coaxially aligned outer pin bores therethrough;
   a second pair of plates in spaced relation to one another, the plates having corresponding first and second ends, the first ends including coaxially aligned bushing bores therethrough, wherein the second pair of plates is disposed adjacent the first pair of plates such that the first ends of the second pair of plates are disposed between the second ends of the first pair of plates so as to coaxially align the outer pin bores with the bushing bores;
   a tubular bushing including an inner pin bore between opposite ends of the tubular bushing, the ends being disposed in the bushing bores of the first ends of the second pair of plates so as to form a segmented pin bore through the inner pin bore and the outer pin bores;
   a retention pin disposed in the segmented pin bore so as to pivotally connect the first and second pair of plates, the retention pin having a head end and a locking end connected by a pin body, the head end being disposed in abutting relation with a first external surface of the first pair of plates, the pin body disposed in the segmented pin bore, and the locking end extending past a second external surface of the first pair of plates opposite the head end;
   a retention cap having a cap body with a cap bearing surface and an outer surface, the cap body configured to engage the locking end of the retention pin such that the cap bearing surface abuts the second external surface of the first pair of plates, the cap body and the retention pin including a dowel pin bore extending from the outer surface at least partially through the cap body and the retention pin; and a dowel pin disposed within the dowel pin bore at least partially through the retention cap and the retention pin, the dowel pin configured to limit axial movement of the retention pin relative to the segmented pin bore and the retention cap.

2. The machine of claim 1, wherein the cap body includes a retention pin bore extending from the cap bearing surface at least partially through the cap body, the locking end of the retention pin being disposed within the retention pin bore.

3. The machine of claim 2, wherein the dowel pin bore is substantially perpendicular to the retention pin bore between the outer surface of the cap body and the retention pin bore.

4. The machine of claim 1, wherein the dowel pin is disposed in the dowel pin bore by an interference fit.

5. The machine of claim 1, wherein the outer surface of the cap body has a first side and a second side, the dowel pin bore extending through the cap body from the first side to the second side.

6. The machine of claim 1, wherein the cap body is disposed within an external cutout in the second external surface of the first pair of plates.

7. The machine of claim 6, wherein the external cutout is between two surface protrusions and the cap body has a top surface opposite the cap bearing surface, the top surface being substantially coplanar with the two surface protrusions.

8. The machine of claim 1, wherein the pin body of the retention pin has a smooth cylindrical surface.

9. The machine of claim 1, wherein the head end of the retention pin further comprises a flange extending radially away from the retention pin, the flange having a flange bearing surface in abutting relation with the first external surface of the first pair of plates.

10. The machine of claim 1, wherein the tubular bushing has a smooth cylindrical interior surface.

11. A retention system for joining adjacent links in a continuous tread comprising a plurality of links pivotally connected to one another, each of the plurality of links having a pair of plates with first ends and second ends, the first ends being connected by a tubular bushing and the second ends forming a cutout into which the first ends and the tubular bushing of an adjacent link are disposed, the retention system comprising:

a retention pin having a head end and a locking end connected by a pin body, the head end disposed in abutting relation with a first external surface of a first link, the pin body disposed in a segmented pin bore formed through the second ends of the first link and the tubular bushing of a second link, and the locking end extending past a second external surface of the first link opposite the head end, wherein outer pin bores of the segmented pin bore are in aligned relation through the second ends of the first link and an inner pin bore of the segmented pin bore extends through the tubular bushing of the second link in aligned relation with the outer pin bores of the segmented pin bore;

a retention cap having a cap body with a cap bearing surface and an outer surface, the cap body configured to engage the locking end of the retention pin such that the cap bearing surface abuts the second external surface of the first link, the cap body and the retention pin including a dowel pin bore extending from the outer surface at least partially through the cap body and the retention pin; and a dowel pin disposed within the dowel pin bore at least partially through the retention cap and the retention pin, the dowel pin configured to limit axial movement of the retention pin relative to the segmented pin bore and the retention cap.

12. The retention system of claim 11, wherein each end of the tubular bushing is disposed in a bushing bore of each of the first ends of the second link.

13. The retention system of claim 12, wherein the dowel pin bore is substantially perpendicular to the retention pin bore between the outer surface of the cap body and the retention pin bore.

14. The retention system of claim 11, wherein the cap body includes a retention pin bore extending from the cap bearing surface at least partially through the cap body, the locking end of the retention pin being disposed within the retention pin bore.

15. The retention system of claim 11 wherein the dowel pin is disposed in the dowel pin bore by an interference fit.

16. The retention system of claim 11, wherein the outer surface of the cap body has a first side and a second side, the dowel pin bore extending through the cap body from the first side to the second side.

17. The retention system of claim 11, wherein the cap body is disposed within an external cutout in the second external surface of the first link.

18. The retention system of claim 17, wherein the external cutout is between two surface protrusions and the cap body has a top surface opposite the cap bearing surface, the top surface being substantially coplanar with the two surface protrusions.

19. The retention system of claim 1, wherein the head end of the retention pin further comprises a flange extending radially away from the retention pin, the flange having a flange bearing surface in abutting relation with the first external surface of the first link.

20. A continuous tread for a machine, the continuous tread comprising:

a first pair of plates in spaced relation to one another, the plates having corresponding first ends and second ends, the second ends including coaxially aligned outer pin bores therethrough;

a second pair of plates in spaced relation to one another, the plates having corresponding first and second ends, the first ends including coaxially aligned bushing bores therethrough, wherein the second pair of plates is disposed adjacent the first pair of plates such that the first ends of the second pair of plates are disposed between the second ends of the first pair of plates so as to coaxially align the outer pin bores with the bushing bores;

a tubular bushing including an inner pin bore between opposite ends of the tubular bushing, the ends being disposed in the bushing bores of the first ends of the second pair of plates so as to form a segmented pin bore through the inner pin bore and the outer pin bores;

a retention pin disposed in the segmented pin bore so as to pivotally connect the first and second pair of plates, the retention pin having a head end and a locking end connected by a pin body, the head end having a flange extending radially away from the retention pin and having a flange bearing surface disposed in abutting relation with a first external surface of the first pair of plates, the pin body disposed in the segmented pin bore, and the locking end extending past a second external surface of the first pair of plates opposite the head end;

a retention cap having a cap body with a cap bearing surface and an outer surface, the cap body including a retention pin bore extending from the cap bearing surface partially through the cap body, the retention bore configured to receive the locking end of the retention pin such that the cap bearing surface abuts the second external surface of the first pair of plates, the cap body and the retention pin including a dowel pin bore extending between opposite first and second sides of the outer surface of the cap body and through the retention pin; and a dowel pin disposed within the dowel pin bore through the retention cap and the retention pin by an interference fit, the dowel pin configured to limit axial movement of the retention pin relative to the segmented pin bore and the retention cap.

\* \* \* \* \*